(12) United States Patent
Kitamura

(10) Patent No.: US 8,844,323 B2
(45) Date of Patent: Sep. 30, 2014

(54) GLASS PREFORM MANUFACTURING METHOD

(75) Inventor: Takayuki Kitamura, Sakura (JP)

(73) Assignee: Fujikura Ltd., Tokyo (JP)

( * ) Notice: Subject to any disclaimer, the term of this patent is extended or adjusted under 35 U.S.C. 154(b) by 180 days.

(21) Appl. No.: 13/233,654

(22) Filed: Sep. 15, 2011

(65) Prior Publication Data

US 2012/0060561 A1    Mar. 15, 2012

(30) Foreign Application Priority Data

Sep. 15, 2010 (JP) ................. 2010-206612

(51) Int. Cl.
*C03B 37/012* (2006.01)
*C03B 37/018* (2006.01)

(52) U.S. Cl.
CPC ....... *C03B 37/01807* (2013.01); *C03B 2201/50* (2013.01); *C03B 2201/54* (2013.01)
USPC .................. 65/417; 65/418; 65/420; 65/399

(58) Field of Classification Search
USPC .................. 65/417, 418, 420, 399
See application file for complete search history.

(56) References Cited

U.S. PATENT DOCUMENTS

2004/0057692 A1* 3/2004 Ball et al. .......... 385/142
2011/0314874 A1* 12/2011 Kitamura .......... 65/418

FOREIGN PATENT DOCUMENTS

| JP | 59-013453 B2 | 3/1984 |
| JP | 59-014412 B2 | 4/1984 |
| JP | 63-040744 A | 2/1988 |
| JP | 63-288926 A | 11/1988 |
| JP | 04-075857 B2 | 12/1992 |
| JP | 06-048775 A | 2/1994 |
| JP | 2007-504080 A | 3/2007 |
| JP | 2007-513862 A | 5/2007 |
| JP | 2007-516829 A | 6/2007 |
| JP | 2007-516929 A | 6/2007 |
| WO | 86/04573 A1 | 8/1986 |
| WO | 2005/021455 A2 | 3/2005 |
| WO | 2005/058765 A1 | 6/2005 |
| WO | 2005/065803 A1 | 7/2005 |
| WO | 2005/066084 A1 | 7/2005 |
| WO | 2006/068941 A2 | 6/2006 |
| WO | 2009/034413 A1 | 3/2009 |

OTHER PUBLICATIONS

Office Action in Japanese Patent Application No. 2010-206612 mailed Apr. 1, 2014 English Translation.

* cited by examiner

*Primary Examiner* — Queenie Dehghan
(74) *Attorney, Agent, or Firm* — Sughrue Mion, PLLC

(57) ABSTRACT

A glass preform manufacturing method, includes: preparing a glass element having a rough surface; turning a raw material of an alkali metal compound or a raw material of an alkaline earth metal compound into particles; depositing particles of the alkali metal compound or the alkaline earth metal compound on the rough surface of the glass element; oxidizing the particles of the alkali metal compound or the alkaline earth metal compound while diffusing alkali metal oxide or alkaline earth metal oxide in the glass element; and manufacturing a glass preform into which the alkali metal oxide or the alkaline earth metal oxide is doped.

14 Claims, 6 Drawing Sheets

| SUBSTANCE | MELTING POINT/°C | BOILING POINT/°C |
|---|---|---|
| NaCl | 801 | 1413 |
| NaBr | 755 | 1390 |
| NaOH | 318 | 1390 |
| KCl | 776 | 1420 (SUBLIMATION) |
| KBr | 731 | 1435 |
| KOH | 360 | 1320 |
| $KNO_3$ | 333 | 400 (DECOMPOSITION) |
| $MgCl_2$ | 714 | 1412 |
| $CaCl_2$ | 772 | 1935 |

SURFACE VIEW

CROSS-SECTIONAL VIEW

SURFACE

GLASS PREFORM MANUFACTURING METHOD

CROSS-REFERENCE TO RELATED APPLICATION

This application is based on and claims priority from Japanese Patent Application No. 2010-206612 filed Sep. 15, 2010, the contents of which are incorporated herein by reference.

BACKGROUND OF THE INVENTION

1. Field of the Invention

The present invention relates to a glass preform manufacturing method, which can accurately control the dopant concentration with low consumption of energy, and particularly, to a glass preform manufacturing method which is adapted to manufacture a low-loss optical fiber.

2. Background Art

Optical fibers produced using silica glass in which alkali metal oxide or alkaline earth metal oxide is doped has been shown by a number of predecessors to reduce the transmission loss thereof.

However, a technique for industrially mass-producing such optical fibers is incomplete.

In order to use a hydrolysis reaction or a thermal oxidation reaction caused by oxygen in gaseous phase in a conventional manufacturing method an optical fiber, it is necessary to use, for example, gaseous raw materials, such as silicon tetrachloride ($SiCl_4$) or germanium tetrachloride ($GeCl_4$).

However, alkali metal ions or alkaline earth metal ions which are so-called hard cations form very strong ionic bonds.

For this reason, most of compounds (salts) formed by such bonds become solid at around ambient temperature and ambient pressure.

Accordingly, since the salts which become gas are hardly formed, it is difficult to apply the salts to the manufacture of optical fibers.

Therefore, in order to commercially produce optical fibers in which alkali metal oxide or alkaline earth metal oxide is doped, a manufacturing method different from the methods conventionally established in this field should be developed.

Various attempts have been taken in regard to such problems.

For example, a method of utilizing the characteristic that an alkali metal compound or an alkaline earth metal compound is easily soluble in water, mixing an aqueous solution of the alkali metal compound in the form of an aqueous mist in a source material gas to introduce the mist into an oxyhydrogen flame, and performing hydrolysis simultaneously with other raw materials to form glass has been attempted (for example, refer to Japanese Examined Patent Application, Second Publication No. S59-13453 and Japanese Examined Patent Application, Second Publication No. S59-14412).

Additionally, a technique of spraying the alkali metal compound onto an over-cladding as an aqueous solution simultaneously with a plasma-enhanced chemical vapor deposition method is disclosed in PCT International Publication No. WO 2009/034413.

Additionally, it is known that some composite salts obtained by reacting certain kinds of alkali metal salts and other metal salts with each other have vapor pressures higher than that of original alkali metal salts. The attempt to use these composite salts as raw materials is also performed (for example, refer to Japanese Patent No. 1787027).

Moreover, in recent years, a method of strongly heating an alkali metal halide or an alkaline earth metal halide to generate alkali metal vapor or alkaline earth metal vapor, exposing an optical fiber precursor glass to this alkali metal vapor, and doping alkali metal to the glass has been attempted (for example, refer to Published Japanese Translation No. 2007-516829 of PCT International Publication and Published Japanese Translation No. 2007.513862 of PCT International Publication, and PCT International Publication No. WO 2006/068941).

The above-described methods of using an aqueous solution of an alkali metal compound or an alkaline earth metal compound are objectionable manufacturing methods from the viewpoint that mixing of moisture which causes an increase in loss in manufacture of optical fibers should be ordinary avoided.

Additionally, in the above-described method of forming composite salts with higher vapor pressure and introducing the composite salts as vapor, the degree of rise in the vapor pressure is small, and the advantage is very restricted. Since some extra chemical species which are ordinary unnecessary for the function of an optical fiber are added in the manufacturing method, there is a concern that a rise in the transmission loss is brought about.

Moreover, the method of strongly heating an alkali metal compound or an alkaline earth metal compound and obtaining alkali metal vapor or alkaline earth metal vapor has an indefinite reaction mechanism of a reduction reaction, and is deficient in practice.

SUMMARY OF THE INVENTION

The invention has been devised in view of such a conventional situation, and the first object of the invention is to provide a glass preform manufacturing method which can accurately control the dopant concentration in the glass preform.

Additionally, the second object of the invention is to provide a glass preform manufacturing method in which the dopant concentration in the glass preform is accurately controlled with low consumption of energy, particularly, at a low processing temperature.

A glass preform manufacturing method of a first aspect of the invention includes: preparing a glass element having a rough surface (glass element preparation step); turning a raw material of an alkali metal compound or a raw material of an alkaline earth metal compound into particles (microparticulation step); depositing particles of the alkali metal compound or the alkaline earth metal compound on the rough surface of the glass element (deposition step); oxidizing the particles of the alkali metal compound or the alkaline earth metal compound while diffusing alkali metal oxide or alkaline earth metal oxide in the glass element (oxidation-diffusion heat processing step); and manufacturing a glass preform into which the alkali metal oxide or the alkaline earth metal oxide is doped.

In the glass preform manufacturing method of the first aspect of the invention, it is preferable that, when the particles are deposited on the rough surface of the glass element (when the deposition step is carried out), the temperature of the glass element be lower than or equal to the temperature at which the alkali metal compound or the alkaline earth metal compound becomes oxide due to oxidation and the temperature of the glass element be higher than or equal to a room temperature.

In the glass preform manufacturing method of the first aspect of the invention, it is preferable that, when the alkali metal oxide or the alkaline earth metal oxide diffused in the glass element (when the oxidation-diffusion heat processing step is carried out), the temperature of the glass element be higher than or equal to the temperature at which the alkali metal compound or the alkaline earth metal compound becomes oxide due to oxidation and the temperature of the glass element be lower than the temperature at which the glass preform rapidly deforms.

In the glass preform manufacturing method of the first aspect of the invention, it is preferable that, when the glass element is prepared (when the glass element preparation step is carried out), soot be formed on the glass element by performing a processing of depositing silica particles on the glass element in gaseous phase, and the rough surface be thereby formed on the glass element (rough surface formation step).

In the glass preform manufacturing method of the first aspect of the invention, it is preferable that, when the rough surface is formed on the glass element (when the rough surface formation step is carried out), the rough surface be formed by performing a wet processing on a surface of the glass element using acid.

In the glass preform manufacturing method of the first aspect of the invention, it is preferable that, when the rough surface is formed on the glass element (when the rough surface formation step is carried out), the rough surface be formed by performing a processing of mechanically grinding a surface of the glass element.

A glass preform manufacturing method of a second aspect of the invention includes: preparing a dummy tube section and a glass tube section, the dummy tube section having a first end and a second end opposite to the first end, the glass tube section having an inner wall and being provided at the second end of the dummy tube section; forming a rough surface on the inner wall by depositing silica particles onto the inner wall of the glass tube section; arranging an alkali metal compound or an alkaline earth metal compound in the dummy tube section; heating and vaporizing the alkali metal compound or the alkaline earth metal compound at a predetermined temperature using a first heat source; allowing a dry gas containing oxygen to flow into the dummy tube section from the first end of the dummy tube section; cooling and condensing vapor of the alkali metal compound or the alkaline earth metal compound with movement of the dry gas in the dummy tube section, and thereby generating particles of the alkali metal compound or the alkaline earth metal compound; depositing, on the rough surface formed on the inner wall of the glass tube section, the particles of the alkali metal compound or the alkaline earth metal compound which are transferred to the glass tube section with movement of the dry gas; and oxidizing the particles of the alkali metal compound or the alkaline earth metal compound by heating the glass tube section using a second heat source which performs traverse while diffusing alkali metal oxide or alkaline earth metal oxide in the glass tube section.

In the glass preform manufacturing method of the second aspect of the invention, it is preferable that, vapor of the alkali metal compound or the alkaline earth metal compound be cooled to the melting point or lower thereof.

In the glass preform manufacturing method of the second aspect of the invention, it is preferable that, a particle diameter of the particles be less than or equal to 100 μm.

In the glass preform manufacturing method of the second aspect of the invention, it is preferable that, the alkali metal compound or the alkaline earth metal compound be halide.

In the glass preform manufacturing method of the second aspect of the invention, it is preferable that, the halide be either chloride or bromide.

In the glass preform manufacturing method of the second aspect of the invention, it is preferable that, the chloride be either potassium chloride or sodium chloride.

In the glass preform manufacturing method of the second aspect of the invention, it is preferable that, the bromide be potassium bromide.

In the glass preform manufacturing method of the second aspect of the invention, it is preferable that, the alkali metal compound be potassium chloride, a dry gas heated at 80° C. to 120° C. be allowed to flow into the dummy tube section, and the predetermined temperature be higher than the melting point of the potassium chloride and the predetermined temperature be lower than the temperature of 1100° C.

Effects of the Invention

In the glass preform manufacturing method of the first aspect of the invention, it is possible to deposit an alkali metal compound or an alkaline earth metal compound on the rough surface of the glass element in a state of being particles while the heating of the alkali metal compound or the alkaline earth metal compound is not performed such that the temperature thereof reaches the melting point of glass.

Consequently, since the step of heating the glass preform (glass element) at a high temperature is only performed in the step of processing the glass element, it is possible to reduce the temperature in the step of manufacturing the glass preform.

Additionally, in addition to the foregoing effect, simply by forming the rough surface possessing a predetermined surface roughness on the inner surface of the glass element, highly-concentrative alkali metal compound or alkaline earth metal compound can be doped in the glass preform while being diffused therein, and it is possible to manufacture the glass preform in which the dopant concentration is accurately controlled.

In the glass preform manufacturing method of the second aspect of the invention, as a glass element on which an alkali metal compound or an alkaline earth metal compound is to be deposited, a glass tube section having a smooth inner wall face is prepared.

Furthermore, the rough surface is formed on the inner wall by depositing silica particles on the inner surface of the glass tube section.

Due to forming the rough surface, the specific surface of the inner wall face increases.

Continuously, the vapor of the alkali metal compound or the alkaline earth metal compound is converted into particles thereof in a cooling portion provided between a reservoir portion and the second end of the dummy tube section.

In addition, the particles pass through the dummy tube section as an aerosol with a dry gas and flows into the glass tube section.

For this reason, according to the glass preform manufacturing method of the second aspect of the invention, in an atmosphere in which the dopant concentration is accurately controlled, highly-concentrative dopant can be introduced into silica glass possessing a high degree of purity.

As a result, it is possible to realize a high purity glass preform manufacturing method applicable to an optical fiber preform.

DESCRIPTION OF THE PREFERRED EMBODIMENTS

Hereinafter, an embodiment of the invention will be described in detail with reference to the drawings.

Figure 1:
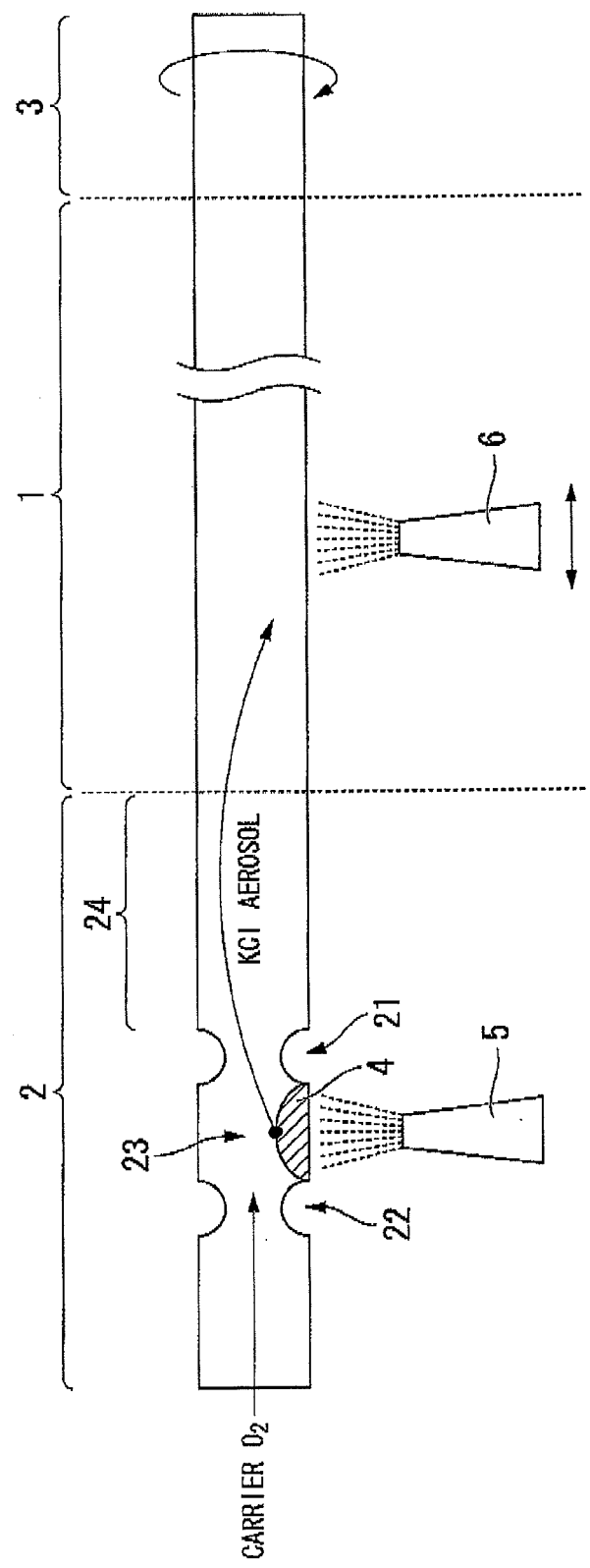
FIG. 1 is a view showing the configuration of a glass preform manufacturing apparatus according to an embodiment of invention.

FIG. 1 is a view showing the configuration of a glass preform manufacturing apparatus according to the embodiment of the invention.

As shown in FIG. 1, the glass preform manufacturing apparatus includes a glass tube section 1, a first dummy tube section 2, and a second dummy tube section 3.

The glass tube section 1 is made of pure synthetic silica ($SiO_2$) glass which does not substantially contain impurities, such as transition metals, and has a length of, for example, 800 mm.

The first dummy tube section 2 and the second dummy tube section 3 are fusion-spliced to both ends of the glass tube section 1, and have a length of, for example, 500 mm.

In this way, a glass tube in which the glass tube section 1, the first dummy tube section 2, and the second dummy tube section 3 are integrally formed is referred to as a "composite glass tube".

Both ends of the composite glass tube are attached to a typical lathe (not shown) for forming modified chemical vapor deposition (MCVD) glass.

In addition, the glass tube section, the first dummy tube section, and the second dummy tube section may be connected together via connection components, and the portions at both ends of the glass tube section in which the glass tube section, the first dummy tube section, and the second dummy tube section are integrally manufactured in advance, may be referred to as dummy tube sections for convenience.

Additionally, a part of the first dummy tube section 2 which allows a source material gas to flow therethrough is provided with a first recessed portion 21 and a second recessed portion 22.

Specifically, by heating an upstream position in the first dummy tube section 2 apart from a connecting portion (a second end), which is between the glass tube section 1 and the first dummy tube section 2, by a predetermined distance (for example, 300 mm), the first dummy tube section 2 is contracted (the diameter of the first dummy tube section 2 is reduced), and a first recessed portion 21 having a predetermined width (for example, 10 mm) is formed in the first dummy tube section 2.

Additionally, by using the same method of forming the first recessed portion 21, the second recessed portion 22 having a predetermined width is provided at an upstream position separated from the first recessed portion 21 by a predetermined interval (for example, 50 mm).

As a result, a portion which is inside of the first dummy tube section 2 and between the first recessed portion 21 and the second recessed portion 22 is defined as a reservoir portion 23.

A predetermined amount (for example, 3 g) of potassium chloride 4 (KCl, the melting point thereof is 776° C.) is placed in the reservoir portion 23 in a state of being a solid.

In addition, a portion of the first dummy tube section 2 and from the connecting portion between the glass tube section 1 and the first dummy tube section 2 to the first recessed portion 21 is defined as a cooling portion 24.

Additionally, an end (a first end) is provided at a position opposite to the connecting portion (the second end) between the first dummy tube section 2 and the glass tube section 1.

Dry oxygen can flow into the inside of the composite glass tube from this end (the first end).

Additionally, the glass preform manufacturing apparatus shown in FIG. 1 includes a first oxyhydrogen burner 5 and a second oxyhydrogen burner 6.

The first oxyhydrogen burner 5 is used in order to heat the reservoir portion 23 from the outside of the reservoir portion 23.

Additionally, the second oxyhydrogen burner 6 is used in order to heat the inside of the glass tube section 1 from the outside of the glass tube section 1 while traversing along the overall length (longitudinal direction) of the glass tube section 1.

In the invention, "traverse" means being relatively moved parallel to the longitudinal direction (axial direction) of the glass tube section 1.

For this reason, as will be described below, the "performing traverse of the second oxyhydrogen burner 6" means relatively moving the second oxyhydrogen burner 6 in the longitudinal direction of the glass tube section 1.

Figure 2:
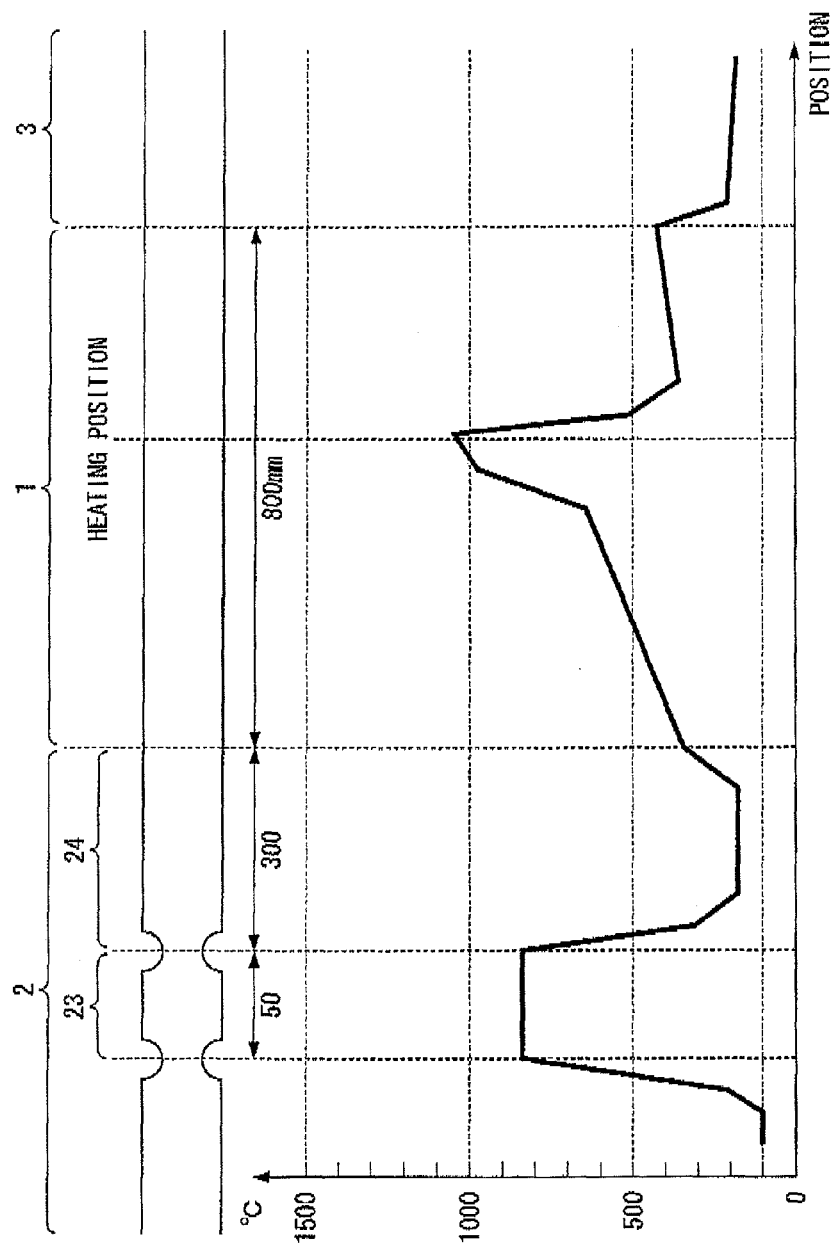
FIG. 2 is a view showing the temperature profile along the longitudinal direction of the outer surface of a composite glass tube, which is measured by an infrared thermometer in a case where a glass preform manufacturing method according to an embodiment of the invention is executed.
Figure 5:
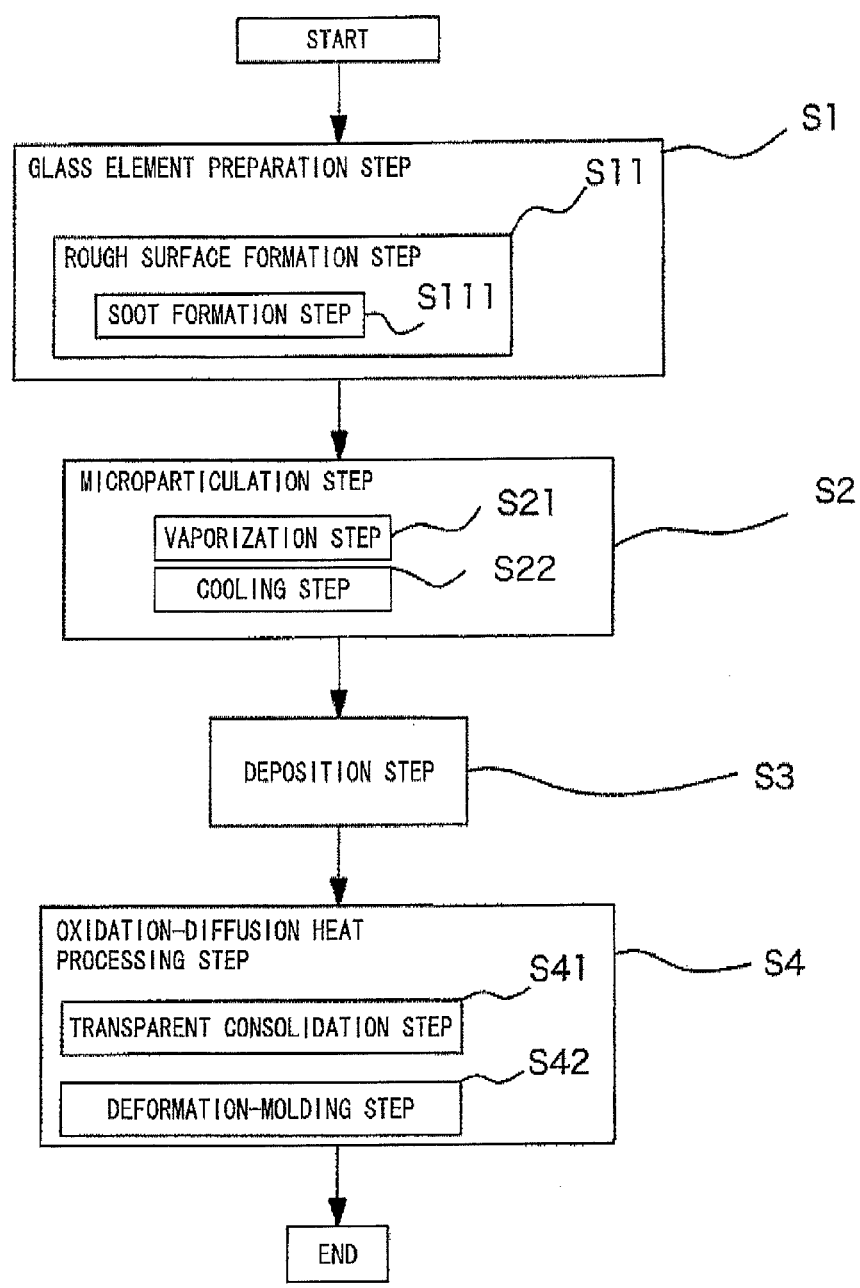
FIG. 5 is a flowchart showing of the glass preform manufacturing method of the embodiment of invention.

FIG. 2 is a view showing the temperature profile along the longitudinal direction of the outer surface of the composite glass tube, which is measured by an infrared thermometer in a case where a glass preform manufacturing method according to the embodiment of the invention is executed. FIG. 5 is a flowchart showing of the glass preform manufacturing method of the embodiment of invention.

Hereinafter, the glass preform manufacturing method according to the embodiment of the invention will be described with reference to FIGS. 1, 2, and 5.

In the glass preform manufacturing method of the embodiment, alkali metal oxide or alkaline earth metal oxide is doped in a glass element which is to be a glass preform.

Specifically, as shown in FIG. 5, the glass preform manufacturing method of the embodiment includes: a glass element preparation step S1, a microparticulation step S2, a deposition step S3, and an oxidation-diffusion heat processing step S4.

In the glass element preparation step S1, a glass element on which a rough surface is formed so that the surface roughness thereof becomes a predetermined value is prepared.

In the microparticulation step S2, a raw material of an alkali metal compound or a raw material of an alkaline earth metal compound is microparticulated.

In the deposition step S3, particles of the alkali metal compound or the alkaline earth metal compound are deposited on a surface of the glass element.

In the oxidation-diffusion heat processing step S4, particles of the alkali metal compound or the alkaline earth metal compound are oxidized, and alkali metal oxide or alkaline earth metal oxide which is generated due to the oxidation is diffused in the glass element.

As described below, the glass preform manufacturing method of the embodiment will be specifically described.

Firstly, in the glass element preparation step S1, a glass element having a rough surface with a desired surface roughness is prepared.

In the glass element preparation step S1, the glass element may be subjected to the rough surface formation step S11 by performing a soot formation step S111.

In the soot formation step S111, firstly, a composite glass tube having a smooth inner surface is prepared, soot is formed on the inner surface of the glass tube while rotating the composite glass tube at a constant speed around the axis of the tube.

Specifically, in a state where the composite glass tube rotates, a source material gas which contains $SiCl_4$ and $O_2$ and is heated to approximately 100° C. flows into the inside of the composite glass tube, a part of the glass tube 1 is heated to approximately 1450° C., the source material gas is oxidized in gaseous phase, and silicon dioxide ($SiO_2$) particles are thereby generated.

The soot is formed on the inner surface by depositing the above-described generated particles on the inner surface of the glass tube 1 and by performing a layering processing.

In this way, a glass element having a rough surface with a desired surface roughness is prepared.

In other cases, in the rough surface formation step S11 of the invention, a smooth glass surface of the glass element may be subjected to a wet processing using, for example, hydrofluoric acid, nitric hydrofluoric acid, mixed acid, or the like in place of the foregoing soot formation step S111.

Furthermore, in the rough surface formation step S11, a smooth glass surface of the glass element may be mechanically grinded using a drill, a grind stone, a sandblast, or the like.

In the soot formation step S111, it is necessary to form the rough surface having a desired surface roughness so that an alkali metal compound or an alkaline earth metal compound can be diffused in glass element in the deposition step S3 and the oxidation-diffusion heat processing step S4 serving as post-processes.

Particularly, it is necessary to form the rough surface so that the surface area increases at the inner wall of the glass element when the rough surface of the glass element is microscopically observed (micro observation).

Additionally, one desired layer or a plurality of desired layers may be deposited on the glass element in advance as described below.

Specifically, a source material gas containing $SiCl_4$ flows into the inside of the glass tube serving as a glass element in advance, and $SiO_z$ is deposited on the inner surface of the glass tube by heating the glass tube 1 at a desired temperature while traverse of a heat source is performed.

Next, a source material gas containing $GeCl_4$ in addition to $SiCl_4$ flows into the inside of the glass tube, the glass tube 1 is heated at a desired temperature while traverse of a heat source is performed, and $SiO_2$ in which germanium dioxide ($GeO_2$) is doped is thereby deposited on the inner surface of the glass element so as to be directly adjacent to $SiO_2$ previously deposited on the inner surface of the glass element.

Accordingly, a glass element having a desired layered structure is prepared.

The foregoing glass element may be subjected to the rough surface formation step S11 and a microparticulation step S2 and a deposition step S3 as described below.

Additionally, a source material gas containing silicon tetrafluoride ($SiF_4$) in addition to $SiCl_4$ flows into the inside of the glass tube serving as a glass element in advance, and $SiO_2$ in which fluorine is doped is deposited on the inner surface of the glass tube by heating the glass tube 1 at a desired temperature while traverse of a heat source is performed.

Next, a source material gas containing $SiCl_4$ flows into the inside of the glass tube, the glass tube 1 is heated at a desired temperature while traverse of a heat source is performed, and $SiO_2$ is thereby deposited on the inner surface of the glass element so as to be directly adjacent to $SiO_2$ in which fluorine is doped and is previously deposited on the inner surface of the glass element.

Accordingly, a glass element having a desired layered structure is prepared.

The foregoing glass element may be subjected to the rough surface formation step S11 and a microparticulation step S2 and a deposition step S3 as described below.

That is, the smooth inner surface of the glass tube (glass element) having a desired layered structure as described above may be subjected to of the soot formation step S111 of the rough surface formation step S11.

Additionally, as a method for depositing one desired layer or a plurality of desired layers on the glass element in advance in the above-described manner, a method may be adopted in which all layers to be deposited on the glass element are formed in a soot state (formed as soot layer) by repeating the soot formation step S111 of forming the aforementioned desired layer in multiple times, and alkali metal oxide or alkaline earth metal oxide is doped in the formed layer.

That is, the rough surface formation step S11 may be carried out so that $SiO_2$ in which $GeO_2$ is doped is deposited on the inner surface of the glass element in a soot state so as to be directly adjacent to $SiO_2$ deposited in a soot form.

Furthermore, an alkali metal compound or an alkaline earth metal compound may be doped in the formed layer by performing the rough surface formation step for each step of forming the aforementioned desired layers.

Specifically, $SiO_2$ serving as a first layer is formed in a soot state by performing the soot formation step S111 of the rough surface formation step S11.

Thereafter, the glass tube having a smooth inner surface in which alkali metal oxide or alkaline earth metal oxide is doped is formed by performing the microparticulation step S2, the deposition step S3, and a transparent consolidation step S41 of the oxidation-diffusion heat processing step S4 as described below.

Subsequently, by the step similarly to the above-described step, $SiO_2$ in which $GeO_2$ is doped may be formed as a second layer.

Moreover, by performing the rough surface formation step S11 to a specific layer in the aforementioned desired layers, alkali metal oxide or alkaline earth metal oxide may be doped in the specific layer.

Next, in the preparation of the microparticulation step S2, the dry oxygen heated to a certain temperature in the range of 80° C. to 120° C. is allowed to flow into the inside of the first dummy tube section 2 from the end (the first end) thereof at a predetermined flow velocity (for example, 1.65 SLM (standard volume L/min)) while rotating a composite glass tube.

In this state, the reservoir portion 23 is heated approximately at 780° C. using the first oxyhydrogen burner 5 which is a heat source, and potassium chloride 4 (KCl) is melted.

The heated dry oxygen further flows for 10 minutes or more at a predetermined flow velocity while potassium chloride 4 is being melted, and potassium chloride 4 is thereby dried.

Next, the reservoir portion 23 is cooled so that the vapor of potassium chloride is not substantially generated.

Next, in a vaporization step S21 of the microparticulation step S2, while the dry oxygen heated at a certain temperature in the range of 80° C. to 120° C. flows at a predetermined flow velocity (for example, 1.65 SLM) in the composite glass tube, the glass outer surface of the reservoir portion 23 is again heated at a certain temperature in the range of 780° C. to 950° C. by the first oxyhydrogen burner 5.

Then, potassium chloride 4 in the reservoir portion 23 melts, and a part thereof becomes vapor according to vapor pressure thereof at the heating temperature.

Since the vapor of potassium chloride is not substantially generated in heating of the melting point or lower, it is required to perform heating such that the heating temperature becomes higher than or equal to the melting point.

In addition, as shown in the experiments that will be described below, as the heating temperature at this time, a temperature range which is approximately 100° C. higher than the melting point of potassium chloride, that is, 780° C. to 900° C. is more preferable.

The vapor of potassium chloride 4 generated in this way is immediately cooled and condensed into a particulate solid by the flowing lower-temperature oxygen in the cooling step S22 of the microparticulation step S2, and is carried as an aerosol into the glass tube section 1 by the flow of oxygen gas.

The temperature profile of FIG. 2 shows a case where the lengths of the reservoir portion 23, the cooling portion 24, and the glass tube section 1 are 50 mm, 300 mm, and 800 mm, respectively.

As shown in FIG. 2, it is understood that, if the cooling portion 24 with a length of approximately 300 mm is provided, the outer surface of the composite glass tube is sufficiently cooled until the temperature thereof becomes 100° C. or lower.

However, this is a sufficient value, and if potassium chloride 4 is cooled such that the temperature of potassium chloride 4 becomes the melting point or lower thereof, a particle forming phenomenon required to obtain the effect of the invention occurs.

In addition, at this time, if scattering of indoor light is observed, it is clear that particles with a particle diameter of approximately 200 nm or more are contained in the composite glass tube.

On the other hand, large and coarse particles greater than approximately 100 μm in particle diameter do not reach the glass tube section 1, but subside immediately and dissolve in the melted potassium chloride 4 at the reservoir portion 23 or deposit on the inner wall of the first dummy tube section 2.

After the carrying of the particles of potassium chloride 4 is brought into a steady state, the outer surface of the glass tube section 1 is heated to a certain temperature of approximately 1000° C. (900° C. to 1100° C.) while the second oxyhydrogen burner 6 serving as a heat source is traversed with respect to the glass tube section 1 at a predetermined speed (for example, approximately 100 mm/min) toward the downstream from the upstream of a gas stream in the deposition step S3.

It is important for the foregoing temperature to be the temperature at which potassium chloride does not become potassium oxide due to oxidation, to be lower than or equal to the temperature at which an alkali metal compound or an alkaline earth metal compound is oxidized due to oxidation, and to be higher than or equal to a room temperature.

Particularly, FIG. 2 shows a temperature profile at the outer surface of the glass tube section in the case where the temperature thereof becomes 1050° C.

At this stage, it is considered that the particles of potassium chloride 4 are deposited on the inner wall of the glass tube section 1 while the particle diameter thereof is being maintained.

At this time, the particles of potassium chloride 4 do not become potassium oxide ($K_2O$) by thermal oxidation.

For this reason, the glass tube section 1 is re-heated by traversing the second oxyhydrogen burner 6 in a state where the particles of potassium chloride 4 are being deposited and attached on the glass tube section 1. In a case where the heating temperature is lower than the melting point of potassium chloride 4, the concentration of potassium chloride 4 hardly decreases.

On the other hand, in a case where the heating temperature is higher than the melting point of potassium chloride 4, part of potassium chloride 4 vaporizes, however, most part of the molten potassium chloride 4 flows in a deep portion of a hole portion which is generated on the rough surface formed by the rough surface formation step.

Additionally, it is believed that part of potassium chloride 4 is diffused in the inside of the glass tube.

In addition, the heating by traverse of the second oxyhydrogen burner 6 is not limited to one time of traverse.

As described below, the heating by traverse may be performed two or more times such that the concentration of potassium oxide reaches a desired concentration and potassium oxide is doped in silica glass.

In the case where the heating temperature is higher than the melting point of potassium chloride 4, part of potassium chloride 4 vaporizes, however, it is possible to allow most part of the molten potassium chloride 4 to flow in a deep portion of a hole portion which is generated on the rough surface formed by the rough surface formation step.

For this reason, it is believed that the concentration of the potassium chloride 4 at the uppermost rough surface decreases and it is possible to increase the dopant concentration by increasing the number of times of that traverse heating is performed.

After such traverse heating by the second oxyhydrogen burner 6, the heating of the reservoir portion 23 is stopped, the reservoir portion 23 is cooled, and generation of potassium chloride vapor is stopped.

Accordingly, the deposition step S3 is completed.

Finally, in the oxidation-diffusion heat processing step S4, the glass tube section 1 which is produced in this way is subjected to post-processes.

In the post-processes, a conventional technique is used while a gas containing oxygen flows in the glass tube section 1.

That is, in the transparent consolidation step S41, $SiO_2$ having a soot state is consolidated into transparent glass.

Next, in a deformation-molding step S42, the glass tube section 1 is contracted and collapsed into a solid glass rod.

By heating the glass tube section 1 in the deformation-molding step S42, potassium chloride particles 4, which are attached to the inner surface of the glass tube section 1 or which exist in the inside hole of soot, are thermally oxidized; and potassium oxide ($K_2O$) is generated.

Additionally, the potassium oxide is diffused in the glass tube section 1 simultaneously with the foregoing thermal oxidation.

Therefore, it is preferable that the temperature of the glass preform in the oxidation-diffusion heat processing step S4 be higher than or equal to the temperature at which an alkali metal compound or an alkaline earth metal compound becomes oxide due to oxidation.

Furthermore, it is only necessary for the upper limit of the temperature of the glass preform to be set in the temperature range in which the shape of the glass does not rapidly change, for example, it is only necessary for the upper limit to be approximately 2700° C. or less when silica glass is employed.

Various verification steps may be carried out between the above-described steps.

For example, in the case the soot formation step S111 is carried out in the rough surface formation step S11, it is possible to determine whether a sufficient thickness of soot is obtained by measuring the deposited thickness of soot using a laser outer shape measuring instrument.

Based on the verification result, if the thickness of soot is insufficient, it is only necessary to repeatedly perform the rough surface formation step S11.

Additionally, part of soot is obtained after the deposition step S3, the obtained soot is analyzed using a fluorescent X-ray analyzer, the containing concentration of alkali metal oxide or alkaline earth metal oxide is measured, and it is thereby possible to determine whether alkali metal oxide or alkaline earth metal oxide is doped in the analyzed soot with a sufficient concentration.

Based on the verification result, if the concentration of soot is insufficient, it is only necessary to repeatedly perform the microparticulation step S2 and the deposition step S1

Furthermore, when a glass tube having a plurality of layers is formed, it is possible to determine whether a sufficient glass thickness is obtained by measuring the thickness of glass using a laser outer shape measuring instrument after the transparent consolidation step S41.

Based on the verification result, if the glass thickness is insufficient, it is only necessary to repeatedly perform the rough surface formation step S11, the microparticulation step S2, and the deposition step S3.

As described above, in the embodiment of the glass preform manufacturing method of the invention, the high-temperature vapor of potassium chloride 4 is generated by the heating by the first oxyhydrogen burner 5, this vapor is immediately cooled and condensed into a particulate solid by the lower-temperature oxygen flowing into the composite glass tube in the portion of the cooling portion 24, and is further carried as an aerosol into the glass tube section 1 by oxygen gas.

At this time, the vapor pressure of the vapor of the potassium chloride 4, that is, the generation amount can be controlled by adjusting the heating temperature of potassium chloride 4.

Additionally, since the agglomeration rate can be controlled by adjusting the temperature, flow rate, and flow velocity of a carrier gas, that is, oxygen gas, the concentration, the particle diameter, and the like of the potassium chloride particles in the aerosol can be easily controlled.

Therefore, if the particle diameter or the like of the particles in the aerosol can be substantially controlled, the addition (dope) concentration of potassium oxide to be introduced into the inside of the glass tube section 1 can be accurately controlled.

Additionally, according to this method, since any compounds containing water or hydrogen atoms are not used, generation of a hydroxyl group (OH) within the glass to be synthesized can be suppressed.

Moreover, it is possible to manufacture silica glass in which potassium oxide is doped, without generating potassium metal vapor by strong heating, and it is possible to manufacture optical fibers with lower consumption of energy.

Furthermore, it is not necessary to form potassium oxide from potassium chloride 4 due to oxidation until oxidation-diffusion heat processing step S4 is carried out.

Since oxidation of potassium chloride 4 and diffusion of potassium oxide simultaneously progress under a requisite heating condition in the oxidation-diffusion heat processing step S4, it is possible to further decrease the temperature in the deposition step S3.

Moreover, since it is possible to increase the concentration of the potassium chloride 4 deposited on the glass tube section 1 in the deposition step S3, potassium chloride 4 can be doped in the glass tube section 1 so as to obtain a required concentration in a short time.

Because of this, the length of the processing time in the steps required for the glass preform manufacturing method can be shortened.

Furthermore, since segregation of dopant, crystallization, and the like are less likely to occur, it is possible to reduce the processing temperature in the glass preform manufacturing method, and the length of the processing time can be shortened.

Hence, if optical fibers are produced using the glass preform manufactured by the manufacturing method of the present embodiment, low-loss optical fibers can be more inexpensively produced.

In addition, in the above embodiment, potassium chloride is adopted as the compound (salt) and potassium oxide is adopted as the dopant. However, the invention is not limited to these materials.

That is, as the metal ion forming compounds, alkali metal ions, such as lithium, sodium, potassium, rubidium, and cesium, or alkaline earth metal ions, such as beryllium, magnesium, calcium, strontium, and barium, can be adopted.

Additionally, as the compound, halide (chloride, bromide, fluoride, and iodide), sulfide, carbonate, hydrogenearbonate, or the like can be adopted.

From the viewpoint of which material is adopted as a raw material among the above materials, a raw material is appropriately selected on the basis of substance-specific physical properties, such as the melting points, the vapor pressure at each temperature, and the heat capacity of vapor of the above materials.

In the dispersion of the particles in the aerosol, the volume for which the particles account rather than the molecular weight has a decisive influence on the dispersed state.

For this reason, it is more important to accurately control the particle diameter of the particles generated by the method mentioned here.

In addition, as the compound, it is also possible to use hydroxide, hydride, and the salts of organic acid or the like.

Since such compounds contain hydrogen in the molecules, and may cause generation of OH group within the glass, it is not necessarily preferable to use such compounds. However, the same effect can be expected by adding an additional dehydration process.

Additionally, although the dry oxygen is allowed to flow in the above-described embodiment, the dry oxygen is not necessarily pure oxygen and has only to be dried gas containing oxygen.

Furthermore, it is not necessary to use a gas containing oxygen except for in the soot formation step S111 and in the oxidation-diffusion heat processing step S4, a so-called inert gas, nitrogen gas, argon gas, or the like can be used.

Additionally, in the above-described embodiment, the conventional MCVD method is adopted and the oxyhydrogen burners are used as two heating devices.

On the other hand, instead of using a flame by the oxyhydrogen burner as a heating device, heating devices, such as an electric furnace and a plasma heating, may be used, or the combination of plural heating devices may be applied for heating.

Particularly, if a heating apparatus capable of turning an alkali metal compound or an alkaline earth metal compound into particles, a temperature maintaining apparatus maintaining the temperature condition required for deposition, and a heating apparatus capable of realizing the temperature condition required for diffusion-oxidation heat-treatment can be used, the invention can be adapted to any heating apparatuses.

Low-loss optical fibers are expected to be produced by manufacturing optical fibers using silica glass in which alkali metal oxide or alkaline earth metal oxide is doped according to the procedure mentioned above.

In order to manufacture an optical fiber from this glass preform, a glass tube section 1 is prepared in advance by using a conventional general method.

Specifically, for example, first, a source material gas containing $SiCl_4$ flows into the composite glass tube, and silicon dioxide ($SiO_2$) is deposited on the inner wall of the glass tube section 1 by heating the glass tube section 1 at a desired temperature while traverse of a heat source is performed.

Next, a source material gas containing $GeCl_4$ in addition to $SiCl_4$ flows into the composite glass tube, and $SiO_2$ in which germanium dioxide ($GeO_2$) is doped so as to be directly adjacent to $SiO_2$ previously deposited within the glass tube section 1 by heating the glass tube section 1 at a desired temperature while traverse of a heat source is performed.

Alternatively, a source material gas containing silicon tetrafluoride ($SiF_4$) in addition to $SiCl_4$ flows into the composite glass tube, and $SiO_2$ in which fluorine is doped is deposited on the inner wall of the glass tube section 1 by heating the glass tube section 1 at a desired temperature while traverse of a heat source is performed.

Next, a source material gas containing $SiCl_4$ flows into the glass tube section 1, and the glass tube section 1 is heated at a desired temperature while traverse of a heat source is performed. Therefore, $SiO_2$ is deposited so as to be directly adjacent to $SiO_2$ in which fluorine is doped to which previously deposited within the glass tube section 1.

Therefore, when optical fibers are manufactured in a post process, the glass tube section 1 having a suitable refractive index profile which exhibits the respective functions of a cladding and a core is prepared.

Additionally, a glass tube 1 having a desired layered structure is prepared, and the glass tube 1 may be subjected to a surface roughness step.

It is only necessary to dope an alkali metal compound or an alkaline earth metal compound, or alkali metal oxide or alkaline earth metal oxide obtained by the deposition and oxidation, which are disclosed in the manufacturing method of the present application, in the glass tube 1 that is subjected to a surface roughness step as described above.

Additionally, as a method for depositing a desired layer on the glass element in advance in the above-described manner, a method may be adopted in which all layers to be deposited on the glass element are formed in a soot state (soot layer) by repeating the soot formation step S111 of forming the aforementioned desired in the rough surface formation step S11.

Furthermore, alkali metal oxide or alkaline earth metal oxide may be doped in the glass element by the above-described method.

Furthermore, an alkali metal compound or an alkaline earth metal compound may be doped in the formed layer by performing the rough surface formation step for each step of forming the aforementioned desired layers.

Specifically, $SiO_2$ serving as a first layer is formed in a soot state by performing the soot formation step S111 of the rough surface formation step S11.

Thereafter, the glass tube having a smooth inner surface in which alkali metal oxide or alkaline earth metal oxide is doped is formed by performing the microparticulation step S2, the deposition step S3, and a transparent consolidation step S41 of the oxidation-diffusion heat processing step S4 as described below.

Subsequently, by the step similarly to the above-described step, $SiO_2$ in which $GeO_2$ is doped may be formed as a second layer.

Moreover, by performing the rough surface formation step S11 to a specific layer in the aforementioned desired layers, alkali metal oxide or alkaline earth metal oxide may be doped in the specific layer.

Glass can be further added to the outer peripheral portion of the silica glass rod in which alkali metal oxide or alkaline earth metal oxide having a suitable refractive index profile is doped by the above-described manner, by a conventional general method, for example, an outside vapor deposition method, a rod in cylinder (RIC) method, or the like, such that an external shape of the resulting glass preform having a desired core/cladding ratio is obtained.

Alternatively, the glass of the outer peripheral portion can also be shaved off by applying a conventional general method, for example, mechanical shaving or grinding, dissolution by fluoric acid, or the like such that an external shape of the resulting glass preform having a desired core/cladding ratio is obtained.

Next, if elongation is made to a desired diameter by a conventional method and drawing is further performed by a conventional method, it is possible to manufacture optical fibers to which alkali metal oxide or alkaline earth metal oxide is doped.

A person skilled in the art can select these methods freely.

Particularly, in the oxidation-diffusion heat processing step S4, it is preferable that melting of soot serving as particulate silica, oxidation of an alkali metal compound or an alkaline earth metal compound, and diffusion of alkali metal oxide or alkaline earth metal oxide be prompted in the glass preform under the temperature condition of approximately 2000° C.

It is preferable that the soot formation step S111 be carried out so that glass has a bulk density of approximately 15 to 30%.

In the microparticulation step S2, it is preferable that the diameter of the particle obtained be maintained in the order of 100 nm or less.

Moreover, when a wet processing is used in the rough surface formation step S11, after the rough surface formation step S11, the aqueous solution of potassium chloride is applied to the heated glass surface, the particles of potassium chloride are attached to the glass surface, the microparticulation step S2 and the deposition step S3 are simultaneously carried out.

Additionally, the present invention is not limited to the above-described method of depositing the particles on the inner surface of the glass tube.

In a state where the glass element is put in an atmosphere containing an alkali metal compound or an alkaline earth metal compound, the alkali metal compound or the alkaline earth metal compound is deposited on the surface of the glass element, thereafter, it is also possible to manufacture silica glass in which alkali metal oxide or alkaline earth metal oxide is doped due to oxidation and diffusion in the oxidation-diffusion heat processing step S4.

Furthermore, in a glass preform manufacturing method using a conventional modified chemical vapor deposition method, particles of oxide are formed by heating a glass preform while transferring an oxyhydrogen burner; after the particles are deposited on the inside of the glass tube positioned at downstream side of a heating portion, the particles are sintered due to heating by the transferred burner, and the particles are consolidated.

In contrast, when a glass preform is manufactured under the above-described temperature condition as described in the embodiment of the invention, the generated glass particles are not sintered, soot of porous solid is deposited on the inner wall of glass.

The specific surface of the soot deposited in the above-described manner can be two or three orders of magnitude greater than the original glass tube.

Furthermore, the soot can be consolidated by heating the soot under a suitable temperature condition.

Even where the deposited amount of KCl per unit area is low, a highly-concentrated $K_2O$ can be doped in the glass preform by using the doped glass element including glass soot having such large specific surface.

Additionally, due to KCl deposited on the surface of the soot being diffused in the inside of pore of the soot, since the uppermost surface concentration of KCl decreases and $K_2O$ is further uniformly doped in the radial direction of the soot, it is possible to suppress segregation or crystallization of KCl.

Hereinafter, with respect to the glass preform manufacturing method, several experiments based on various specific values are shown.

Experiment 1

A glass tube (Suprasil-F300 made by Shin-Etsu Quartz Products Co., Ltd.) made of pure synthetic silica glass which contains a hydroxyl group of less than 1 ppm, iron ions of less than 0.005 ppm, and aluminum ions of less than 0.05 ppm, and has an external diameter of 32 mm, a thickness of 2.5 mm, and a length of 800 mm was adopted as the glass tube section 1.

This glass tube is transparent, and the inner surface and outer surface thereof is smooth.

Additionally, two dummy tubes made of pure synthetic silica glass, each of which has a length of approximately 500 mm and has the same external diameter and thickness as those of the glass tube section 1 were adopted as the first dummy tube section 2 and the second dummy tube section 3.

Both ends of a composite glass tube in which the glass tube section 1, the first dummy tube section 2, and the second dummy tube section 3 were integrated were attached to an MCVD glass forming lathe.

Additionally, the first recessed portion 21 is provided at the upstream position apart from a joining portion between the first dummy tube section 2 and the glass tube section 1 by approximately 300 mm so as to have a width of approximately 10 mm.

Additionally, the second recessed portion 22 is provided at the upstream position apart from the first recessed portion 21 by approximately 50 mm so as to have a width of approximately 10 mm.

Additionally, the potassium chloride 4 put into the reservoir portion 23 is made by Tri Chemical Laboratories Inc., and has the purity of 99.999% or more and a weight of approximately 3 g.

After the composite glass tube was prepared as described above, the following operations were performed while rotating the composite glass tube at a constant speed around the axis of the tube using the lathe.

The heating temperature of the dry oxygen was set to 100° C., and the flow velocity was set to 1.65 SLM (standard volume L/min).

Additionally, the temperature for temporarily vaporizing the potassium chloride 4 by the first oxyhydrogen burner 5 was set to approximately 800° C. to 850° C. (higher than the melting point by approximately 100° C. or less).

KCl was dried by allowing the dry oxygen further heated to approximately 100° C. to flow into the composite glass tube for 10 minutes or more at a flow velocity of 1.65 SLM, with KCl melted.

Next, after the reservoir portion was cooled, pure silica glass soot was formed on the inner wall of the glass tube section 1 under the condition that the heating temperature is lower than that of a usual MCVD method.

Specifically, the dry oxygen including dry silicon tetrachloride ($SiCl_4$) heated to approximately 100° C. was introduced into the composite glass tube from the upper stream of the dummy tube.

By heating the temperature of the outer surface of the glass tube section 1 to approximately 1450° C. while traversing the flame of the oxyhydrogen burner, soot made of pure particulate silica glass which has a particle size of approximately tens to hundreds of nanometers was deposited on the inner wall of the glass tube section 1.

Next, while allowing the dry oxygen heated to a certain temperature of approximately 100° C. to flow into the composite glass tube at 1.65 SLM, the glass outer surface of the reservoir portion 23 is again heated so as to have a temperature of 800° C. to 900° C. (higher than the melting point by approximately 100° C. or less).

Therefore, the vapor at the temperature was generated from a portion of KCl, according to a vapor pressure at such heating temperature.

The generated KCl vapor was immediately cooled and condensed by the flowing lower-temperature oxygen to generate a particulate solid, and the particulate solid is carried as an aerosol into the glass tube section 1 by oxygen gas.

At this time, since scattering of indoor light resulting from the particle size of the particles was observed in the composite glass tube, the observed particles include particles with a particle size of approximately 200 nm or more, and do not include large and coarse particles greater than approximately 100 μm that subside immediately.

After the carrying of the KCl particles was brought into a steady state, the outer surface of the glass tube section 1 was heated to 1000° C. while the second oxyhydrogen burner 6 which is a heat source is made to traverse at a speed of approximately 100 mm/min toward the downstream from the upstream of a gas stream.

The inventors found out that a gas-phase oxidation reaction from KCl to $K_2O$ proceeds only after becoming 1100° C. or higher.

For this reason, it is believed that the KCl particles are deposited on the soot surface without being oxidized under the present conditions.

After the traverse was performed 3 times, the heating of the reservoir portion 23 was stopped and allowed to be cool.

Moreover, the soot was made into transparent glass by heating the outer surface of the glass tube section 1 to 1700° C. or higher while the oxyhydrogen burner 6 which is a heat source is made to traverse at a speed of approximately 100 mm/min toward the downstream from the upstream of the gas stream.

The glass tube section produced in this way was contracted and collapsed using a related-art technique, and thereby, a solid glass rod was obtained.

A glass preform of Experiment 1 was manufactured in this manner.

Next, it is believed that potassium oxide can be doped in the glass tube section 1 such that the glass tube section 1 has an arbitrary concentration by increasing the number of times by which traverse of the second oxyhydrogen burner 6 is performed.

For this reason, the following experiments were performed.

Experiment 2

Traverse of the second oxyhydrogen burner 6 to be used for the heating of the glass tube section 1 was performed 5 times, and a glass preform was manufactured similarly to Experiment 1.

Experiment 3

Traverse of the second oxyhydrogen burner 6 to be used for the heating of the glass tube section 1 was performed 10 times, and a glass preform was manufactured similarly to Experiment 1.

Experiment 4

The reservoir portion was not provided in the composite glass tube 1 used in Example 1, KCl was also not performed, and a glass rod was produced by the above process.

The specific refractive index distribution in the glass rod produced as described above was measured using a preform analyzer.

Figure 6:
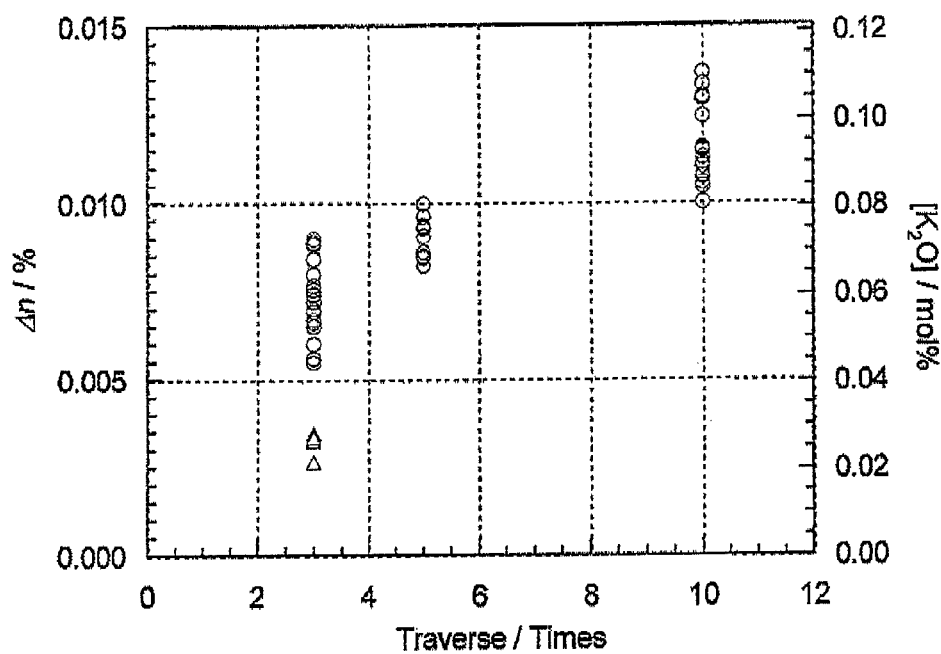
FIG. 6 is a view showing the result of each of the experiments in a case where the number of times of traversing the second oxyhydrogen burner is changed.

When the percentages of specific refractive index changes of central portions of the glass rods produced in Experiments 1 to 3 to the specific refractive index of pure silica of a central portion of the glass rod produced in Experiment 4 was plotted (0 mark) as a function of the number of times by which traverse was performed, results as shown in FIG. 6 were obtained.

Meanwhile, it is generally known that if the concentration of the dopant to be doped in silica glass is low, the specific refractive index change in the silica glass is proportional to the dopant concentration.

According to Non-patent Document (J. Schroeder, J. Non-Cryst., Solids, Vol. 40, p. 549 (1980)), it is reported that the proportional factor of the refractive index change resulting from the doping of $K_2O$ in the silica glass is $+1.8 \times 10^{-3}$ [$\Delta$/mol %].

The dopant concentration of $K_2O$ converted using this proportional factor is shown on the right axis of FIG. 6

It can be easily imagined by a person skilled in the art that the dopant concentration of $K_2O$ can be controlled according to the number of times by which traverse was performed, and it was observed that a specific refractive index difference monotonously increases with respect to the number of times by which traverse was performed.

However, the tendency of leveling-off (peak-out) was seen with an increase in the number of times by which traverse was performed.

It is believed that this shows that the addition of KCl to be doped in the silica glass is influenced by not only deposition velocity but a diffusion velocity at which KCl is diffused in glass.

Additionally, while the heating temperature of the reservoir portion 23 influences the particle size, it is natural that this heating temperature also influences particulate concentration.

For this reason, if heating is performed at a higher temperature, for example, approximately 900° C., it can be easily expected that a greater increasing tendency than the tendency shown in FIG. 6 is obtained according to an increase in the number of times by which traverse is performed.

For this reason, a high concentration of $K_2O$ can be doped in the glass by a smaller number of times of traverse.

On the contrary, if heating is performed at a lower temperature, for example, approximately 800° C., it can be easily expected that a smaller increasing tendency than the tendency shown in FIG. 6 is obtained according to an increase in the number of times by which traverse is performed.

For this reason, it is possible to control the dopant concentration of $K_2O$ more accurately.

In order to confirm effect that the surface area of the glass tube increases due to forming the soot made of silica particles, an experiment of doping $K_2O$ in a smooth transparent glass tube without forming soot was tried.

Experiment 5

The process of forming the silica soot is not performed in this Experiment 5.

Additionally, in Experiment 5, the outer surface temperature of the glass tube section 1 was set 1000° C. similarly to Experiment 1 by traversing the second oxyhydrogen burner 6 over the glass tube section 1 to heat the glass tube section while rotating the composite glass tube.

Additionally, the traverse velocity of the second oxyhydrogen burner 6 was set to approximately 100 mm/min, and traverse was performed 3 times to add potassium oxide to the glass tube section 1.

The glass tube section 1 produced by such a process was contracted and collapsed similarly to Experiment 1, and thereby, a solid glass rod was obtained.

Experiment 6

An experiment in which traverse of the second oxyhydrogen burner 6 to be used for the heating of the glass tube section 1 was performed 6 times, and an experiment in which traverse of the second oxyhydrogen burner 6 was performed 10 times were performed.

Except for conditions for the number of times of such traverse, a glass rod was produced by the same method as Experiment 5.

In Experiment 6, the number of crystals which deposit on the inner wall of the glass tube 1 increased with the increase in the number of times by which traverse was performed, and air bubbles were generated in glass in the process of contraction and collapse.

For this reason, the specific refractive index could not be measured precisely.

When the percentage of the specific refractive index change of a central portion of only the glass rod produced in Experiment 5 to the specific refractive index of the pure silica of the central portion of the glass rod produced in Experiment 4 was plotted (A mark) as a function of the number of times by which traverse was performed similarly to the above-described method, results as shown in FIG. 6 were obtained.

When Experiment 5 and Experiment 1 are compared with each other in a case where the numbers of times by which traverse was performed are the same, it is understood that the specific refractive index change is increasing by using a glass element in which particles are deposited as soot glass compare to the using a smooth transparent glass.

Particularly, it is understood that the specific refractive index change of Experiment 1 is approximately 2 to 3 times that of Experiment 5.

That is, in Experiment 1, it is understood that $K_2O$ is doped in the glass preform in a concentration of approximately 2 to 3 times the concentration of $K_2O$ of Experiment 5.

The specific surface area of soot formed by depositing silica particles under the conditions of the above soot forming process is greater than the surface of smooth transparent glass by approximately 2 to 3 orders of magnitude.

However, the amount of change of the specific refractive index is not so great as described above, and the amount of $K_2O$ doped is also approximately 2 to 3 times, which is not much.

Figure 7A:
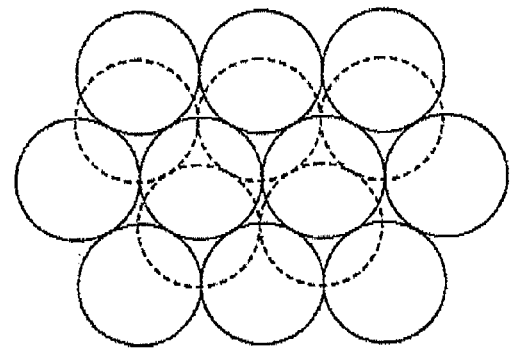
FIG. 7A is a view schematically showing a surface state of deposited silica particles.
Figure 7B:
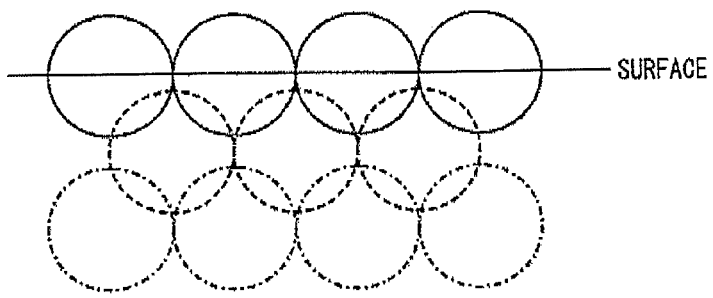
FIG. 7B is a view schematically showing a surface state of deposited silica particles.

Supposing that the silica particles deposited on the glass element are ideally close-packed in a spherical shape, and that only one layer on the outermost surface contributes to expansion of the surface, it is considered that the structure as shown in schematic views shown in FIGS. 7A and 7B is formed in the glass element.

That is, it can be assumed that a surface (rough surface) with such a structure that a semi-sphere protrudes from the surface of the glass element is formed, and the surface area at this time becomes only $(1+\pi/4)$ times the area of a plane.

FIGS. 7A and 7B schematically show the surface state of deposited silica particles.

FIG. 7A is a surface view, and FIG. 7B is a cross-sectional view in a thickness direction.

In FIGS. 7A and 7B, one layer of silica particles on the uppermost surface is shown by a solid line, silica particles on a second layer from the uppermost surface is shown by a dotted line, and silica particles on a third layer from the uppermost surface is shown by a one-dot chain line.

Since a larger amount of $K_2O$ is doped in the glass preform so that the specific refractive index change of Experiment 1 is approximately 2 to 3 times that of Experiment 5 as shown in FIG. 6 irrespective of the fact that the structures as shown in FIGS. 7A and 7B are considered, it is considered that KCl particles are diffused in a gas phase and do not reach a deep portion of the deposited silica particulate soot, but the KCl particles are diffused at least up to the surfaces of silica particles located on several layers from the uppermost surface of the soot.

Additionally, since the heating temperature in such a diffusion process is higher than the melting point of KCl, it is considered that molten KCl flows through porous holes of the soot, and reaches the surfaces of the silica particles over several layers from the uppermost surface of the soot.

Experiment 6 showed that it is difficult to increase the amount of addition of KCl because segregation or crystallization of KCl proceeds, whereas Experiments 2 and 3 showed that a higher concentration of $K_2O$ than that of Experiment 1 was doped in the glass preform.

This reason will be described below.

In the case of transparent silica glass, the deposited KCl particles are only diffused in a glass bulk, and the diffusion velocity of the KCl particles is slow at a low temperature of approximately 1000° C. Therefore, it is considered that newly deposited KCl as increase the number of times by which traverse was performed increases the surface concentration of KCl, and segregation or crystallization of particles is caused.

In contrast, in the case of the soot formed from the silica particles, the deposited KCl is not only diffused in a silica glass bulk, but is diffused on the surfaces of the silica particles at a higher speed through the porous holes of the soot made of the silica particles.

Therefore, KCl reaches the surfaces of the silica particles over several layers from the uppermost surface of the soot, and it is considered that segregation or crystallization is suppressed due to a decline in the concentration of KCl in the uppermost surface.

If KCl is oxidized in a gas phase under the conditions that the heating temperature of the glass tube is 1000° C., and $K_2O$ that has a higher melting point and is easily vitrified is generated, it is not confirmed that segregation or crystallization of KCl in Experiment 6 and that diffusion of molten KCl up to several layers inside from the uppermost surface of the silica soot in Experiments 1 to 3.

For this reason, it is clear that KCl is deposited on the soot surface as particles.

As described, under the conditions of the above deposition process, it is clear that KCl is not oxidized and is deposited on the soot surface as particles, that the KCl particles are not diffused in a gas phase up to deep portions of holes of the porous structure of the soot, that the KCl particles are deposited over several layers in the vicinity of the surfaces of the silica particles which constitute the soot, that the KCl particles are diffused in the surfaces of the silica particles and reach the inside of the soot, and that an oxidation reaction of KCl that begins to reach the subsequent oxidization and diffusion process proceeds.

In other words, if the surface area of the glass element which is the material of the glass preform can be increased up to approximately several times to approximately ten and several times, $K_2O$ which has a larger amount of approximately 2 to 3 times compared to a case where $K_2O$ is doped in a smooth surface can be doped.

Additionally, even if the surface area increases so as to exceed a certain degree of area, it is expected that a greater effect than the above-described effect is not obtained.

Therefore, it can be easily expected that the same effect as the above-described effect is obtained even in a processing method which cannot enlarge the surface area much so as to increase the surface roughness of the glass element by wet processing by acid, such as fluoric acid, or by mechanical grinding processing, such as whetstone processing or sandblasting.

Since the temperature conditions in which a gas-phase oxidation reaction of particulate KCl proceeds are unknown, the following experiments were conducted.

Experiment 7

The heating temperature of the reservoir portion 23 was set to approximately 850° C. to 900° C. (approximately 100° C. higher than the melting point).

The second oxyhydrogen burner 6 was made to traverse the glass tube 1 while rotating the glass tube 1.

When the outer surface temperature of the heated glass tube section 1 was 1000° C., 1300° C., 1500° C., 1700° C., and 1850° C., experiments were performed.

Except for a case where the number of times of traverse is one, a glass rod was produced by the same method as Experiment 5.

The specific refractive index distribution of the glass rod produced as described above was measured using a preform analyzer.

Figures 3, 4:
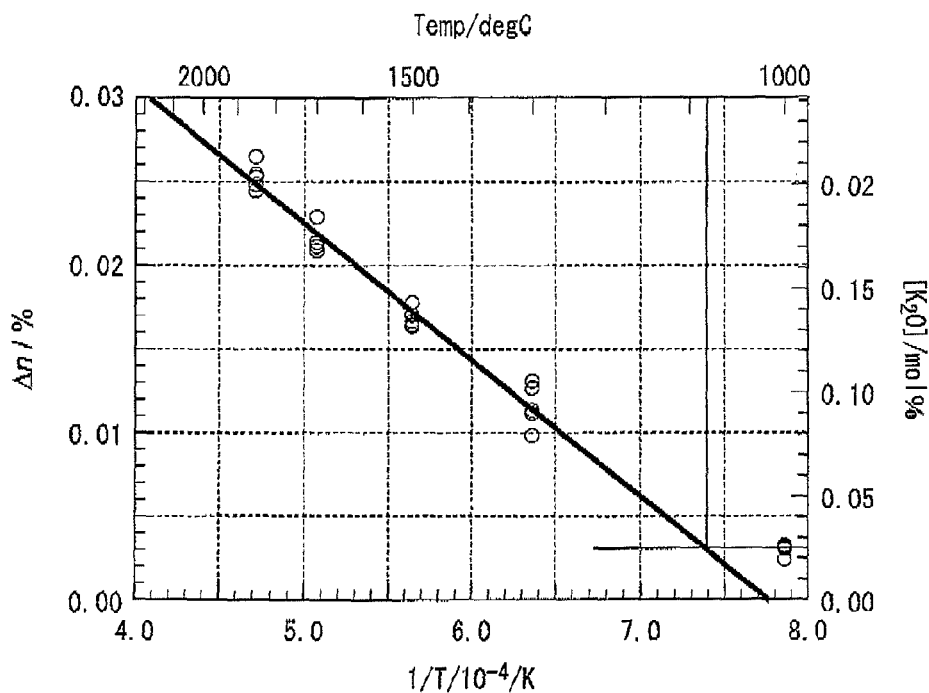
FIG. 3 is a view showing the results of each of experiments in a case where the outer surface temperature of a glass tube section which is heated by traversing a second oxyhydrogen burner is varied.
FIG. 4 is a view showing the melting points and boiling points of various substances as a table.

When the percentage of the specific refractive index change of a central portion of the glass rod produced in Experiment 7 to the specific refractive index of pure silica of the central portion of the glass rod produced in Experiment 4 was plotted as a function of the heating temperature of the glass tube section 1, results as shown in the graph of FIG. 3 were obtained.

Additionally, similarly to FIG. 6, the dopant concentration of potassium oxide converted using the proportional factor of the refractive index change is shown on the right axis of FIG. 3.

As shown in FIG. 3, when the percentages of the specific refractive index changes were plotted with respect to the inverse of the temperature, good linearity was obtained within a heating temperature range of 1300° C. or higher of the glass tube section 1.

Additionally, when the heating temperature was 1000° C., the values of the percentages of the specific refractive index changes did not become 0 (zero) similarly to the specific refractive index changes observed in Experiments 1 to 3, and 5.

As shown by an auxiliary line in FIG. 3, it is understood that, in a heating temperature range of 1100° C. or higher, the specific refractive indexes, and the dopant concentration of $K_2O$ to be doped in glass can be predicted linearly from the heating temperature.

Additionally, it is considered that, in this temperature range, the KCl particles are oxidized to $K_2O$ in a gas phase, and are deposited on the glass.

Additionally, it is believed that an oxidation reaction in which KCl in a gas phase is oxidized to $K_2O$ does not proceed at a heating temperature of 1100° C. or lower, and it is believed that the specific refractive index change appears since a portion of KCl are deposited while remaining unreacted on the surface of the glass was diffused and incorporated in the glass.

That is, it was proved that KCl can be deposited on the glass surface without being accompanied by a reaction in which KCl is oxidized to $K_2O$, by setting the heating temperature to approximately 1100° C. or lower.

Experiment 8

A glass preform was manufactured in a state where the temperature of the dry oxygen which flaws into the glass tube section 1 was set to 80° C., and the temperature of the reservoir portion 23 was set to approximately 780 to 850° C. (higher than the melting point by approximately 100° C. or lower).

Additionally, the same method as Experiment 1 was used except for the temperature conditions.

Experiment 9

A glass preform was manufactured in a state where the temperature of the dry oxygen which flows into the glass tube section 1 was set to 120° C.

Additionally, the same method as Experiment 8 was used except for the temperature conditions.

Next, when an experiment was performed by lowering the temperature of the reservoir portion 23 and changing the temperature of the dry oxygen by which the KCl vapor generated due to heating was cooled, scattering of light was hardly observed in the gas phase flows into the composite glass tube.

As a result, it is considered that KCl is carried as particles with a particle size of approximately 100 nm or less.

Additionally, the specific refractive index change of the glass in which $K_2O$ was doped coincided with the result Experiment 1 where the number of times by which traverse was performed was 3 times within a range of variation of the plot shown in FIG. 3.

Compared to the temperature of the KCl vapor generated due to the heating using the first oxyhydrogen burner 5, it is believed that the KCl particles with a particle size of 100 nm or less are formed by cooling the KCl vapor by the dry oxygen with a sufficiently low temperature.

Experiment 10

A glass preform was manufactured by the same method as Experiment 1, except for using potassium bromide (KBr) instead of potassium chloride.

Experiment 11

A glass preform was manufactured by the same method as Experiment 1, except for using sodium chloride (NaCl) instead of potassium chloride.

As shown in FIG. 4, since the melting points of KBr and NaCl are almost the same as that of KCl and the chemical properties are also alike, the specific refractive index distribution of a glass rod produced according to the same conditions as Experiment I was measured using a preform analyzer.

The percentages of the specific refractive index change to the specific refractive index of pure silica of the central portion of the glass rod produced in Experiment 4 were approximately 0.007±0.003% and approximately 0.006-10.003%, respectively.

The dopant concentrations of $K_2O$ and $Na_2O$ calculated using the proportional factors $+1.8 \times 10^{-3}$ and $+1.5 \times 10^{-3}$ [Δ/mol %] of the refractive index change caused by the addition of $K_2O$ and $Na_2O$ shown in the above Non-patent Document were 0.005±10.003 [mol %] and 0.005±0.003 [mol %], respectively.

All the results were almost the same as the results of Experiment 1 produced using KCl.

The above experiments have been described on the basis of specific temperature conditions in a case where KCl, NaCl, and KBr are used as raw materials.

The raw materials to be used when manufacturing a glass preform should be appropriately selected according to physical properties peculiar to substances, such as melting point, vapor pressure at each temperature, and heat capacity of vapor of an alkali metal compound or an alkaline earth metal compound to be used.

In the dispersion of the particles in an aerosol, the volume that the particles account for rather than molecular weight has a decisive influence.

For this reason, it is more important to accurately control the particle size of the particulates generated by the method mentioned here.

In the above-described experiments, the manufacturing method used in order to manufacture a rod-shaped glass in which alkali metal oxide is doped using a glass tube made of pure synthetic silica, have been described in detail.

On the other hand, since a core preform in which alkali metal oxide is doped can be manufactured if a glass tube having a desired specific refractive index distribution instead of the above glass tube is used, the invention can be applied to a method for manufacturing an optical fiber preform.

Additionally, if a glass element having a desired shape is used instead of the above glass tube, the invention can also be used for the manufacture of various kinds of glassware, for example, lenses or window glass.

Moreover, the invention can also be used for manufacture of an optical filter, and an in-plane refractive index change glass plate in which the in-plane distribution of the refractive index is accurately set.

Otherwise, the invention can also be used for a manufacturing method for stacking a transparent electrode or conductive glass on substrate plate glass.

INDUSTRIAL APPLICABILITY

The manufacturing method of the invention can be applied particularly to the manufacture of a glass preform appropriate to production of low-loss optical fibers.

What is claimed is:

1. A glass preform manufacturing method, comprising:
preparing a glass element having a rough surface;
heating a raw material of an alkali metal compound or a raw material of an alkaline earth metal compound, generating vapor of the alkali metal compound or the alkaline earth metal compound causing the vapor to flow into a cooling portion, cooling and condensing the vapor, thereby generating particles at the cooling portion;
depositing particles of the alkali metal compound or the alkaline earth metal compound on the rough surface of the glass element;
oxidizing the particles of the alkali metal compound or the alkaline earth metal compound while diffusing alkali metal oxide or alkaline earth metal oxide in the glass element; and
manufacturing a glass preform into which the alkali metal oxide or the alkaline earth metal oxide is doped.

2. The glass preform manufacturing method according to claim 1, wherein
when the particles are deposited on the rough surface of the glass element, a temperature of the glass element is lower than or equal to the temperature at which the alkali metal compound or the alkaline earth metal compound becomes oxide due to oxidation and is higher than or equal to a room temperature.

3. The glass preform manufacturing method according to claim 1, wherein
when the alkali metal oxide or the alkaline earth metal oxide is diffused in the glass element, a temperature of the glass element is higher than or equal to the temperature at which the alkali metal compound or the alkaline earth metal compound becomes oxide due to oxidation and is lower than the temperature at which the glass preform rapidly deforms.

4. The glass preform manufacturing method according to claim 1, wherein
when the glass element is prepared, soot is formed on the glass element by performing a processing of depositing silica particles that are produced in gaseous phase on the glass element, and the rough surface is thereby formed on the glass element.

5. The glass preform manufacturing method according to claim 1, wherein
when the glass element is prepared, the rough surface is formed by performing a wet processing on a surface of the glass element using acid, and the rough surface is thereby formed on the glass element.

6. The glass preform manufacturing method according to claim 1, wherein
when the glass element is prepared, the rough surface is formed by performing a processing of mechanically grinding a surface of the glass element, and the rough surface is thereby formed on the glass element.

7. A glass preform manufacturing method, comprising:
preparing a dummy tube section and a glass tube section, the dummy tube section having a first end and a second end opposite to the first end, and a cooling portion near the second end, the glass tube section having an inner wall and being provided at the second end of the dummy tube section;
forming a rough surface on the inner wall by depositing silica particles onto the inner wall of the glass tube section;
arranging an alkali metal compound or an alkaline earth metal compound in the first end of the dummy tube section;
heating and vaporizing the alkali metal compound or the alkaline earth metal compound at a predetermined temperature using a first heat source, thereby generating vapor of the alkali metal compound or the alkaline earth metal compound;
allowing a dry gas containing oxygen to flow into the dummy tube section from the first end of the dummy tube section, thereby the vapor flowing into the cooling portion;
cooling and condensing the vapor of the alkali metal compound or the alkaline earth metal compound in the cooling portion with movement of the dry gas in the dummy tube section, and thereby the cooling portion generating particles of the alkali metal compound or the alkaline earth metal compound;
depositing, on the rough surface formed on the inner wall of the glass tube section, the particles of the alkali metal compound or the alkaline earth metal compound which are transferred from the cooling portion to the glass tube section with movement of the dry gas; and
oxidizing the particles of the alkali metal compound or the alkaline earth metal compound by heating the glass tube section using a second heat source which performs traverse while diffusing alkali metal oxide or alkaline earth metal oxide in the glass tube section.

8. The glass preform manufacturing method according to claim 7, wherein
the vapor of the alkali metal compound or the alkaline earth metal compound is cooled to the melting point or lower thereof.

9. The glass preform manufacturing method according to claim 7, wherein
a particle diameter of the particles is less than or equal to 100 μm.

10. The glass preform manufacturing method according to claim 7, wherein
the alkali metal compound or the alkaline earth metal compound is halide.

11. The glass preform manufacturing method according to claim 10, wherein
the halide is either chloride or bromide.

12. The glass preform manufacturing method according to claim 11, wherein
the chloride is either potassium chloride or sodium chloride.

13. The glass preform manufacturing method according to claim 11, wherein
the bromide is potassium bromide.

14. The glass preform manufacturing method according to claim 7, wherein
  the alkali metal compound is potassium chloride, a dry gas heated at 80° C. to 120° C. is allowed to flow into the dummy tube section, and
  the predetermined temperature is higher than the melting point of the potassium chloride and is lower than the temperature of 1100° C.

\* \* \* \* \*